United States Patent
Do (10) Patent No.: US 12,539,911 B2
(45) Date of Patent: Feb. 3, 2026

(54) METHOD FOR AUTONOMOUSLY DRIVING AN ACTUATOR OF A DEVICE

(71) Applicants: RENAULT S.A.S, Boulogne Billancourt (FR); NISSAN MOTOR CO., LTD., Kanagawa-ku (JP)

(72) Inventor: Anh-Lam Do, Guyancourt (FR)

(73) Assignees: AMPERE S.A.S., Boulogne Billancourt (FR); NISSAN MOTOR CO., LTD., Kanagawa-ku (JP)

( * ) Notice: Subject to any disclaimer, the term of this patent is extended or adjusted under 35 U.S.C. 154(b) by 166 days.

(21) Appl. No.: 18/554,102

(22) PCT Filed: Mar. 9, 2022

(86) PCT No.: PCT/EP2022/056097
§ 371 (c)(1),
(2) Date: Oct. 5, 2023

(87) PCT Pub. No.: WO2022/214268
PCT Pub. Date: Oct. 13, 2022

(65) Prior Publication Data
US 2024/0367714 A1    Nov. 7, 2024

(30) Foreign Application Priority Data

Apr. 6, 2021 (FR) ..................... 21 03505

(51) Int. Cl.
*B62D 6/00* (2006.01)
*B60W 50/02* (2012.01)
*B60W 60/00* (2020.01)

(52) U.S. Cl.
CPC ........... *B62D 6/00* (2013.01); *B60W 50/0205* (2013.01); *B60W 60/001* (2020.02)

(58) Field of Classification Search
CPC ... B62D 6/00; B62D 15/025; B60W 50/0205; B60W 60/001; B60W 50/0098
See application file for complete search history.

(56) References Cited

U.S. PATENT DOCUMENTS

2015/0183429 A1*  7/2015  Shiozawa .............. B60W 10/22
                                                              701/48
2016/0362136 A1* 12/2016  Oya ..................... B62D 5/0454
(Continued)

FOREIGN PATENT DOCUMENTS

CN          107531276 A  *  1/2018  ............ B60W 30/12
CN          111713004 A  *  9/2020
(Continued)

OTHER PUBLICATIONS

CN-111713004-A translation (Year: 2020).*
(Continued)

*Primary Examiner* — Kyle T Johnson
(74) *Attorney, Agent, or Firm* — Oblon, McClelland, Maier & Neustadt, L.L.P.

(57) ABSTRACT

A method is for autonomously driving an actuator of an automotive device. The actuator is intended to have an influence on the trajectory of the device. The method includes acquiring parameters relating to the trajectory of the device and a computer calculating a setpoint for driving the actuator as a function of the parameters via a controller associated with at least one saturation function for an output of the controller. The controller satisfies a model of the at least one saturation function per nonlinear sector.

12 Claims, 4 Drawing Sheets

(56) References Cited

U.S. PATENT DOCUMENTS

| | | | |
|---|---|---|---|
| 2018/0017971 A1 | 1/2018 | Di Cairano et al. | |
| 2022/0185327 A1* | 6/2022 | Do | B60W 60/0015 |
| 2022/0250678 A1* | 8/2022 | Keßler | B62D 6/08 |
| 2022/0379883 A1* | 12/2022 | Bruno | B60W 30/0956 |
| 2024/0001914 A1* | 1/2024 | Do | B60W 30/09 |
| 2024/0320316 A1* | 9/2024 | Peresse | G06F 21/44 |
| 2024/0367714 A1* | 11/2024 | Do | B62D 6/00 |
| 2025/0136124 A1* | 5/2025 | Do | B60W 50/0098 |

FOREIGN PATENT DOCUMENTS

| | | | | |
|---|---|---|---|---|
| CN | 118387095 A * | 7/2024 | | B60W 30/10 |
| FR | 2994677 A1 * | 2/2014 | | B60W 50/0098 |
| WO | WO-2019192117 A1 * | 10/2019 | | G05B 11/42 |
| WO | WO 2020/182373 A1 | 9/2020 | | |
| WO | WO-2024037725 A1 * | 2/2024 | | B60W 30/09 |

OTHER PUBLICATIONS

WO-2019192117-A1 translation (Year: 2019).*
CN-118387095-A translation (Year: 2024).*
FR-2994677-A1 translation (Year: 2014).*
CN-107531276-A translation (Year: 2018).*
WO-2024037725-A1 translation (Year: 2024).*
International Search Report Issued Jun. 15, 2022, in PCT/EP2022/056097, filed on Mar. 9, 2022, 2 pages.
French Search Report Issued Nov. 16, 2021, in FR Application 21 03505, filed on Apr. 6, 2021, 3 pages (with English Translation of Categories of Cited Documents).

* cited by examiner

METHOD FOR AUTONOMOUSLY DRIVING AN ACTUATOR OF A DEVICE

TECHNICAL FIELD OF THE INVENTION

The present invention generally relates to automation of path following for automotive apparatuses.

It is particularly advantageously applicable in the context of motor-vehicle driver-assistance systems, but it is also applicable to the field of aeronautics or robotics.

It more particularly relates to a method for autonomously controlling an actuator of an automotive apparatus that is configured to influence the path of said apparatus, comprising steps of:
acquiring parameters relating to the path of the apparatus, and
computing, using a computer, a control setpoint of said actuator depending on said parameters, by means of a controller associated with at least one saturation function of an output of the controller.

It also relates to an apparatus equipped with a computer configured to implement this method.

It is more particularly, but not exclusively, applicable to getting a motor vehicle to follow an obstacle avoidance path.

PRIOR ART

In order to make motor vehicles safer, they are currently equipped with driver-assistance systems or autonomous driving systems.

Among these systems AEB systems (AEB standing for Automatic Emergency Braking) are in particular known, these systems being designed to avoid any collision with obstacles located in the lane being followed by the vehicle, by simply acting on the conventional braking system of the motor vehicle.

However, there are situations in which these AEB systems do not allow a collision to be prevented or are not usable (for example, if some machine is right behind the motor vehicle).

For these situations AES systems (AES standing for Automatic Evasive Steering) have been developed, these systems allowing an obstacle to be avoided by deviating the vehicle from its path, either by acting on the vehicle's steering, or by acting on the vehicle's differential braking system. It will be noted that the obstacle may be in the same lane as the vehicle or in an adjacent lane, in which case it is detected that this obstacle may intersect the path of the vehicle in a short time.

However, the AES system may impose on the vehicle a path that is borderline in terms of controllability, preventing the driver from regaining control of the vehicle safely.

Thus, document FR3099450 discloses a solution consisting in using a controller that allows a control setpoint to be generated such that the vehicle remains controllable by the driver of the vehicle should the latter wish to regain control during the avoidance procedure. To this end, the controller limits the magnitude and speed of the change in direction imposed on the motor vehicle, by means of hyperbolic tangent functions. Although this solution is effective in many configurations, it has a performance (i.e. in terms of how well the avoidance path is followed) that could be improved in some instances because the LPV modeling used (LPV standing for Linear Parameter-Varying) is conservative and does not explicitly describe the typical characteristics of saturations.

PRESENTATION OF THE INVENTION

In order to remedy the aforementioned drawback of the prior art, the present invention provides a control method such as defined in the introduction, wherein the controller allows modeling of said at least one saturation function to use dead-zone nonlinearity.

In other words, the controller is synthesized on the basis of an approach employing dead-zone nonlinearity, so as to be able to guarantee not only the stability of the automotive apparatus in all situations, but also a good performance as soon as the situation permits.

Thus, the invention provides a more appropriate technique for modeling saturation functions. This technique has many advantages over the solution described in document FR3099450.

As mentioned above, it first ensures a good performance is achieved, i.e. that position and heading are followed well, this allowing the vehicle to follow with greater precision the reference path computed to avoid the obstacle.

The claimed solution further ensures high stability as long as any disturbances have a bounded energy, i.e. in particular as long as the path to be followed has a curvature remaining within acceptable bounds. In other words, this solution makes it possible to quickly determine whether the computed avoidance path is achievable dynamically by the vehicle, so as to activate the AES function only when this is the case.

The invention further makes provision for stability conditions to be separated from performance conditions during synthesis of the controller. More precisely, in linear mode (when the controller is not saturated) the controller guarantees performance (this implying stability). In saturation mode (when the controller is saturated) this controller seeks to stabilize the system in a closed-loop fashion. Thus, the controller does not always seek to guarantee stability and performance at the same time, regardless of the operating mode, this allowing a better performance to be obtained in certain operating modes.

In other words, in case of saturation, the controller mainly seeks to guarantee the stability of the system. In the absence of saturation (which is statistically generally the case) it also seeks to guarantee performance, i.e. that the avoidance path is followed well. It thus makes it possible to obtain better results than those obtained using the methods proposed in the prior art, where stability always took precedence over performance.

According to the invention, the controller functions even if the initial states (initial heading, initial yaw rate, etc.) of the vehicle at the time at which the AES function is triggered are zero, this arising when the vehicle already has a certain dynamic (for example, because it is in a bend when the AES function is triggered), this not being the case with the solution described in FR3099450. To achieve this result, the controller is synthesized considering the initial states of the vehicle.

The invention further makes provision for automatic computation of the gains of the corrector used in the control law of the vehicle, this allowing the conception time of this control law to be decreased.

The provided controller is optimal and consistent with the controllability limits specific to the vehicle, because constraints on steering angle and on steering speed are taken into account beforehand in the synthesis of the controller.

The robustness of the controller is further guaranteed for some obstacle-avoidance-path curvatures (provided that the energy required to follow this path remains bounded), on account of the saturation conditions of the actuator (related to the controllability of the vehicle by the driver).

As will become apparent in the rest of the description, the method for estimating the stability zone in which the controller must remain consists here of an estimation of a basin of attraction. This method guarantees stability if the initial state of the vehicle, at the time of activation of the AES function, meets certain criteria.

The method according to the invention yields good results in terms of vehicle stability, of performance (path followed well), and of tolerance to delays in measurement of the data used in the context of the invention.

The following are other advantageous and non-limiting features of the method according to the invention, these features being implementable individually or in any technically possible combination:

- the apparatus is a motor vehicle that is configured to travel by road and that comprises at least one steered wheel, wherein said actuator is configured to control the steering angle of said steered wheel, and wherein the control setpoint is a saturated setpoint of the steering angle of said steered wheel;
- the saturation function respects a model limiting the amplitude of the control setpoint and is expressed in the form: $\psi_1(x)=sat_n(Kx)-Kx$, with K the controller, $sat_n$ an amplitude-limiting function, and x a state vector of said apparatus;
- the saturation function respects a model limiting the variation in the control setpoint and is expressed in the form: $\psi_2(x)=sat_v(A_1x+B_1sat_n(Kx))-(A_1x+B_1sat_n(Kx)$ with K the controller, $sat_v$ an amplitude-limiting function, A1 and B1 predetermined matrices, and x a state vector of said apparatus;
- given a basin of attraction located in at least one polyhedron defined depending on how said at least one saturation function is modeled, in the absence of disturbance, the controller guarantees that a state vector of said apparatus has successive values over time that remain in the basin of attraction d that asymptotically converge toward the origin within a predetermined time;
- given a basin of attraction located in at least one polyhedron defined depending on how said at least one saturation function is modeled, in the presence of a disturbance the energy of which is less than a predetermined threshold, the controller guarantees that a state vector of said apparatus has successive values over time that remain in the basin of attraction;
- the output to be minimized is expressed in the form: $z=e_{y_L}+\alpha_\omega \omega_L$ with $e_{yL}$ the path-following error, $\Psi_L$ the heading-angle error, and $\alpha_\psi$ an adjustment coefficient that varies over time;
- in the absence of saturation of the output of the controller, the controller guarantees that the synthesis of the $H^\infty$ norm applied to the controller is less than a predetermined scalar;
- one of said parameters is a variable that depends on the curvature of the path;
- said basin of attraction is defined by means of a Lyapunov function, of disturbances that apply to said apparatus and of a term that depends on said at least one saturation function;
- the controller allows modeling of said apparatus in which an output to be minimized is dependent on a path-following error and a heading-angle error;
- the importance of the path-following error and the importance of the heading-angle error in the computation of the control setpoint vary over time.

Preferably, provision is made to deactivate the controller:

- as soon as the initial values of a state vector of said apparatus do not belong to a first predetermined space, or
- when said initial values do not belong to the first space and the instantaneous values of said state vector do not belong to a second predetermined space.

This method of deactivating the controller is determined based on the stability zone and on state parameters of the vehicle (drift angle, yaw rate, heading angle, lateral position, steering-wheel angle, steering-wheel speed and the curvature of the path to be followed). The stated deactivation conditions make it possible to guarantee that the controller will function correctly and to diagnose abnormal situations (risk of vehicle instability, sensor failure, actuator failure, unexpected vehicle/driver behavior, etc.).

The invention also relates to an automotive apparatus comprising at least one actuator that is configured to influence the path of said apparatus and a computer for controlling said actuator, programmed to implement a method such as described above.

Of course, the various features, variants and embodiments of the invention may be associated with one another in various combinations insofar as they are not mutually incompatible or exclusive.

DETAILED DESCRIPTION OF THE INVENTION

The following description, which is given with reference to the appended drawings, which are given by way of non-limiting examples, will allow of what the invention consists and how it may be implemented to be clearly understood.

Figure 1A:
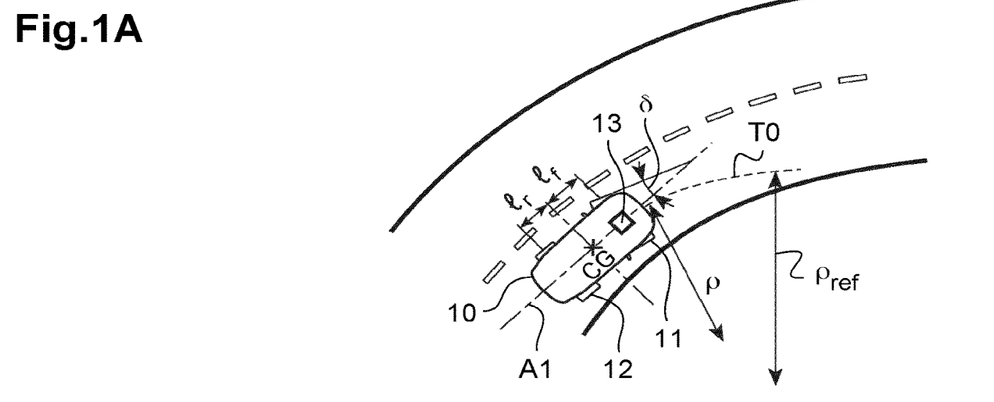
FIG. 1A is a schematic view from above of a motor vehicle that is traveling on a road and that is configured to implement a method according to the invention.

FIG. 1A shows a motor vehicle 10 that comprises, as is conventionally the case, a chassis defining a passenger compartment, two steered front wheels 11, and two unsteered rear wheels 12. As a variant, these two rear wheels could also be steered, given suitable modification of the control law.

This motor vehicle 10 comprises a conventional steering system allowing the orientation of the front wheels 11 to be changed so as to make the vehicle turn. This conventional steering system in particular comprises a steering wheel connected to links in order to cause the front wheels 11 to pivot. In the considered example, it also comprises an actuator allowing the orientation of the front wheels to be changed depending on the orientation of the steering wheel and/or depending on a request received from a computer 13.

In addition, provision will possibly be made for this motor vehicle to comprise a differential braking system making it possible to act differently on the speeds of rotation of the front wheels 11 (and, where appropriate, on those of the rear wheels 12) so as to slow the motor vehicle while causing it to turn. This differential braking system for example comprises a controlled differential or electric motors placed on the wheels of the vehicle.

In the remainder of this description, the considered steering system will be formed by the conventional steering system alone. As a variant, it could be formed by the combination of the conventional steering system and of the differential braking system.

The computer 13 is then intended to control the power-steering actuator. To this end, it comprises at least one processor, at least one memory and various input and output interfaces.

By virtue of its input interfaces, the computer 13 is able to receive input signals from various sensors.

Among these sensors, provision is for example made for the following:
- a device, such as a front camera, allowing the position of the vehicle with respect to its traffic lane to be determined,
- a device such as a RADAR or LIDAR remote sensor, allowing an obstacle 20 located on the path of the motor vehicle 10 to be detected (FIG. 2),
- at least one lateral device, such as a RADAR or LIDAR remote sensor, allowing the environment on the sides of the vehicle to be observed,
- a device such as a gyrometer, allowing the yaw-wise rotation rate (about a vertical axis) of the motor vehicle 10 to be determined, and
- a sensor for sensing the position and the angular speed of the steering wheel.

By virtue of its output interfaces, the computer 13 is able to transmit a setpoint to the power-steering actuator.

Figure 2:
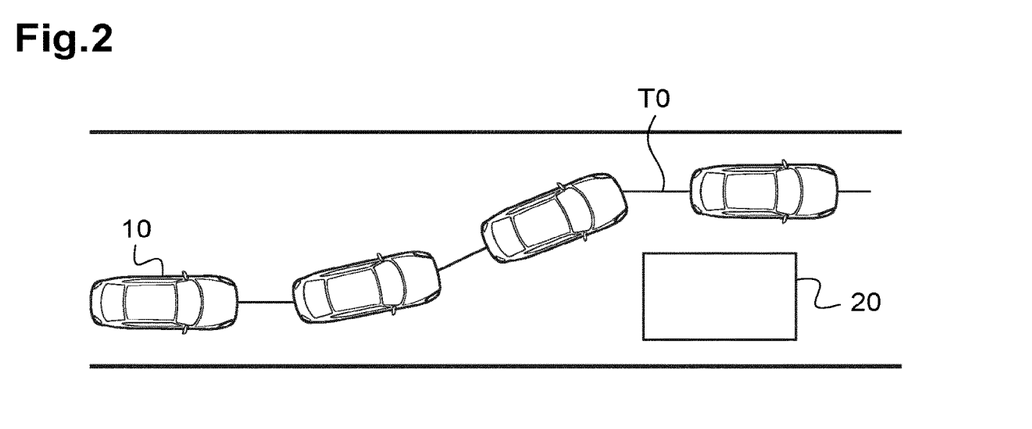
FIG. 2 is a schematic perspective view of the motor vehicle in FIG. 1A, shown in four successive positions located along an obstacle avoidance path.

It thus makes it possible to force the vehicle to follow an avoidance path T0 allowing the obstacle 20 to be avoided (see FIG. 2).

By virtue of its memory, the computer 13 stores data used in the context of the method described below.

In particular, it stores a computer application, consisting of computer programs comprising instructions the execution of which by the processor allows the computer to implement the method described below.

Figure 1B:
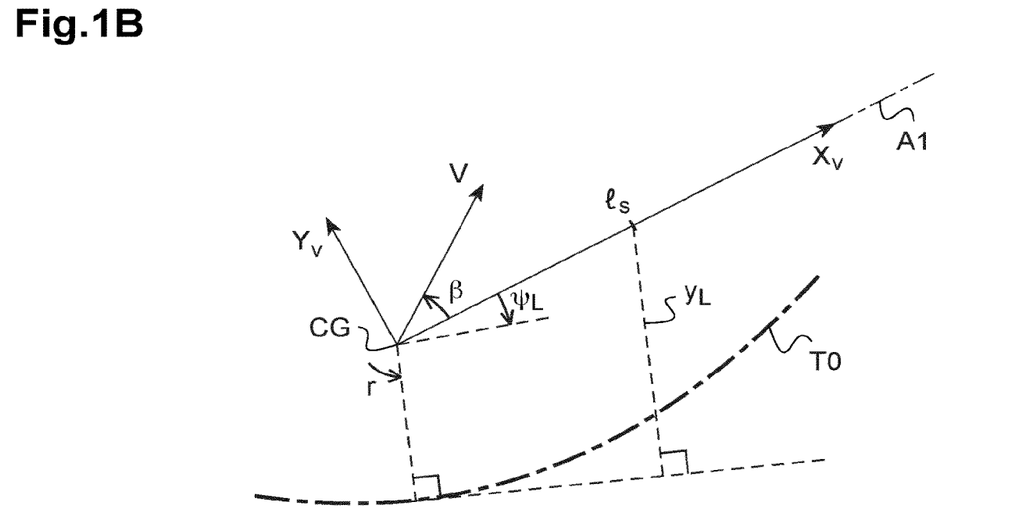
FIG. 1B is a similar view of FIG. 1A.

Before describing this method, the various variables that will be used, some of which are illustrated in FIGS. 1A and 1B, will be introduced.

The total mass of the motor vehicle will be denoted "m" and will be expressed in kg.

The inertia of the motor vehicle around a vertical axis passing through its center of gravity CG will be denoted "J" and will be expressed in N·m.

The distance between the center of gravity CG and the front axle of the vehicle will be denoted "$l_f$" and will be expressed in meters.

The distance between the center of gravity CG and the rear axle will be denoted "$l_r$" and will be expressed in meters.

The coefficient of cornering stiffness of the front wheels will be denoted "$C_f$" and will be expressed in N/rad.

The coefficient of cornering stiffness of the rear wheels will be denoted "$C_r$" and will be expressed in N/rad.

These coefficient of cornering stiffness of the wheels are concepts well known to those skilled in the art. By way of example, the coefficient of cornering stiffness of the front wheels is thus the coefficient in the equation $F_f = 2 \cdot C_f \cdot \alpha_f$, with $F_f$ being the lateral sliding force of the front wheels and $\alpha_f$ being the cornering angle of the front wheels.

The steering angle that the steered front wheels make to the longitudinal axis A1 of the motor vehicle 10 will be denoted "δ" and will be expressed in rad.

The variable $\delta_{ref}$, expressed in rad, will designate the saturated steering-angle setpoint, such as transmitted to the power-steering actuator.

The variable $\delta_k$, expressed in rad, will denote the unsaturated steering-angle setpoint. At this stage, it will merely be noted that the concept of saturation is related to steering-angle and steering-speed limits that might not necessarily be respected with the variable $\delta_k$, but that will be respected with the variable $\delta_{ref}$.

The variable $\delta_{sat}$, expressed in rad, will designate the semi-saturated steering-angle setpoint. It is derived from the unsaturated setpoint $\delta_k$ and is saturated in steering angle only. The saturated setpoint $\delta_{ref}$ will be computed on the basis of this semi-saturated setpoint $\delta_{sat}$.

The reference frame of the vehicle will here have its origin at the center of gravity CG of the latter. Its abscissa Xv will be oriented along the longitudinal axis A1 of the motor vehicle 10, and its ordinate Yv will be oriented laterally, on the left-hand side of the vehicle.

The yaw rate of the vehicle (around the vertical axis passing through its center of gravity CG) will be denoted "r" and will be expressed in rad/s.

The relative heading angle between the longitudinal axis A1 of the vehicle and the tangent to the avoidance path T0 (desired path of the vehicle) will be denoted "$\Psi_L$" and will be expressed in rad.

The lateral deviation between the longitudinal axis A1 of the motor vehicle 10 (passing through the center of gravity CG) and the avoidance path T0, at a target distance "ls" located in front of the vehicle, will be denoted "$y_L$" and will be expressed in meters.

The setpoint for the lateral deviation between the longitudinal axis A1 of the motor vehicle 10 (passing through the center of gravity CG) and the avoidance path T0, at a target distance "ls" located in front of the vehicle, will be denoted "$y_{L-ref}$" and will be expressed in meters.

The path-following error will be denoted "$e_{yL}$" and will be expressed in meters. It will be equal to the difference between the lateral deviation setpoint $Y_{L-ref}$ and the lateral deviation $y_L$.

The aforementioned target distance "ls" will be measured from the center of gravity CG and will be expressed in meters.

The cornering angle of the motor vehicle 10 (angle that the speed vector of the motor vehicle makes to its longitudinal axis A1) will be denoted "β" and will be expressed in rad.

The speed of the motor vehicle will be denoted "V" and will be expressed in m/s.

The constants "ξ" and "ω" will represent dynamic characteristics of the steering angle of the front wheels of the vehicle.

The constant "$\omega_f$" will for its part represent a dynamic characteristic of an arbitrary bounded disturbance "w" applied to the vehicle.

The constant "g" will be the acceleration due to gravity, expressed in m·s$^{-2}$.

Steering speed will designate the angular steering speed of the steered front wheels.

The method according to the invention is intended to allow the vehicle to follow the avoidance path T0 as precisely as possible, in autonomous mode. This method is implemented when the AES function is triggered and an avoidance path T0 has been computed. It will be noted that the manner in which the AES function is triggered and the avoidance path T0 computed is not strictly speaking the subject of the present invention, and will therefore not be described here. This method is intended to be implemented in a loop, in successive "time increments".

It will be noted here that the path following is intended to be implemented by the computer 13 autonomously, but that it must also be able to be interrupted at any time to allow the driver to regain control of the vehicle. It must also be able to be used as driver-assistance system when the driver is holding the steering wheel but is not exerting on the steering wheel the torque required to avoid the obstacle.

Before describing the method that will be executed by the computer 13 to implement the invention itself, in a first part of this description the computations that allowed the invention to be obtained will be described, in order to allow where these computations came from and on which reasoning they are based to be clearly understood.

Specifically, the idea in the first part of the description is to describe the way in which a controller that, once implemented in the computer 13, will allow the vehicle to be controlled so that it follows the avoidance path T0 in a stable and effective manner, may be synthesized.

Here, it will be considered that the dynamic behavior of the vehicle may be modeled by means of the following equation Math 1.

$$\begin{pmatrix} \dot{\beta} \\ \dot{r} \\ \dot{\psi}_L \\ \dot{e}_{y_L} \\ \ddot{\delta} \\ \dot{\delta} \\ \dot{\rho}_{ref} \end{pmatrix} = \begin{bmatrix} -\frac{C_f + C_r}{mV} & -1 + \frac{C_r l_r - C_f l_f}{mV^2} & 0 & 0 & 0 & \frac{C_f}{mV} & 0 \\ -\frac{C_f l_f - C_r l_r}{J} & -\frac{C_r l_r^2 + C_f l_f^2}{JV} & 0 & 0 & 0 & \frac{C_f l_f}{J} & 0 \\ 0 & 1 & 0 & 0 & 0 & 0 & 0 \\ V & l_s & V & 0 & 0 & 0 & -V \\ 0 & 0 & 0 & 0 & -2\xi\omega & -\omega^2 & 0 \\ 0 & 0 & 0 & 0 & 1 & 0 & 0 \\ 0 & 0 & 0 & 0 & 0 & 0 & -\omega_f \end{bmatrix} \begin{pmatrix} \beta \\ r \\ \psi_L \\ e_{y_L} \\ \dot{\delta} \\ \delta \\ \rho_{ref} \end{pmatrix} + \begin{bmatrix} 0 \\ 0 \\ 0 \\ 0 \\ \omega^2 \\ 0 \\ 0 \end{bmatrix} \delta_{ref} + \begin{bmatrix} 0 \\ 0 \\ 0 \\ 0 \\ 0 \\ 0 \\ \omega_f \end{bmatrix} w$$

[Math 1]

This model is an improved bicycle model.

The term $\omega_f$ is used to model the rate of change of the curvature of the avoidance path T0 to be followed (which path is computed and therefore already known).

The avoidance-path T0 curvature term $\rho_{ref}$ thus allows the path of the vehicle (and therefore the curvature of the road) to be taken into account in the model of the dynamic behavior of the vehicle.

However, this model does not in itself limit the steering angle and the steering speed of the front wheels 11 of the vehicle. However, such a limitation proves to be particularly important for ensuring that the driver of the vehicle is able to regain control of the vehicle at any time.

Such limitations may be expressed, using the following equation, by a saturation of steering speed:

$$|\dot{\delta}_{ref}| \leq \upsilon \quad \text{[Math 2]}$$

as well as, using the following equation, by a saturation of steering amplitude:

$$|\delta_{ref}| \leq \eta. \quad \text{[Math 3]}$$

In equation Math 2, the coefficient $\upsilon$ is a constant representing the steering speed not to be exceeded. This constant is defined either by computation, or at the end of a test campaign carried out on a test vehicle. For example, it is equal to 0.0491 rad/s, this corresponding to 0.785 rad/s at the steering wheel (i.e. 45°/s) if the gearing ratio of the steering is equal to 16.

In the equation Math 3, the coefficient n is a constant representing the steering angle not to be exceeded. This constant is defined either by computation, or at the end of a test campaign carried out on a test vehicle. It is for example equal to 0.0328 rad, this corresponding in the present example to 0.524 rad at the steering wheel (i.e. to 30°).

The constraint expressed by the equation Math 3 allows the torque exerted by the power-steering actuator to be limited so that an average driver can manually compensate for this torque.

Specifically, the greater the steering angle, the greater the force applied by the power-steering actuator. This limitation thus ensures that the user will be able to regain control of the vehicle without having to counter too great a force. This angle will thus depend on the force applied by the type of actuator chosen.

It will be noted that the aforementioned values are given by way of example and could as a variant be lower (for example 25°/s and 20° to ensure greater comfort).

According to the invention, it is desired to limit the steering angle and speed of the steered wheels 11 not by imposing an abrupt threshold, but rather by gradually saturating the set-point amplitude and the set-point variation.

Figure 3:
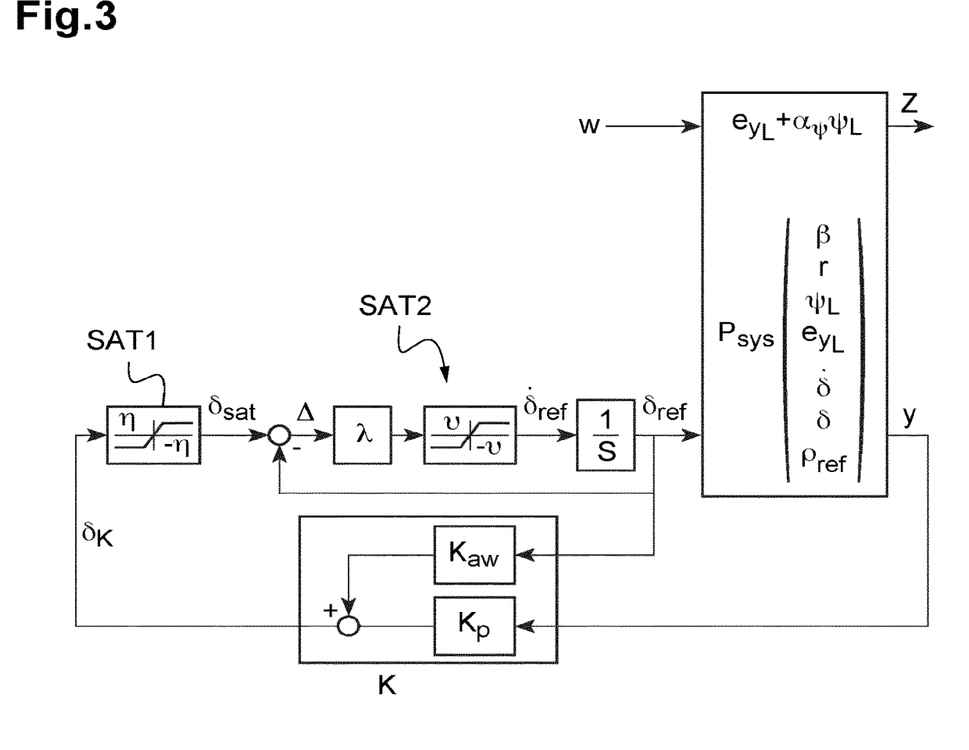
FIG. 3 is a schematic illustrating the closed-loop transfer function used to control the motor vehicle of FIG. 1A.

FIG. 3 shows the control architecture used to control the power-steering actuator so that it follows the avoidance path T0 while meeting the aforementioned constraints.

This figure shows a controller K that allows an unsaturated steering-angle setpoint ok to be computed. This controller K advantageously comprises a summer that the unsaturated steering-angle delivers as output setpoint $\delta_k$ and that receives as input a state feedback term (delivered by a state feedback block $K_p$) that depends on the state of the vehicle, and a saturation compensation term (delivered by a saturation compensation block $K_{aw}$) that depends on the saturated steering-angle setpoint $\delta_{ref}$ computed in the preceding time increment.

The saturation compensation term allows the stability of the controller in non-linear mode, i.e. in cases where control of the power-steering actuator is saturated in amplitude or in speed, to be increased.

The block SAT1 shown in FIG. 3 illustrates the saturation in amplitude of the unsaturated steering-angle setpoint $\delta_k$. It receives as input the output of the controller K and it delivers as output a semi-saturated steering-angle setpoint $\delta_{sat}$. It may be seen that this block operates in an open-loop mode.

The set of blocks SAT2 illustrates the saturation in speed of the semi-saturated steering-angle setpoint $\delta_{sat}$. It receives as input this semi-saturated setpoint and it delivers as output the saturated steering-angle setpoint $\delta_{ref}$. It may be seen that it is a closed loop. In this set of blocks SAT2, corresponding to a "pseudo rate limiter" function, a summer is therefore provided at the input of SAT2, which summer makes it possible to compute the difference $\Delta$ between the semi-saturated steering-angle setpoint $\delta_{sat}$ and the saturated steering-angle setpoint $\delta_{ref}$ of the preceding time increment. It comprises a multiplier block allowing this difference to be multiplied by a parameter $\lambda$, a saturation block preventing the derivative of the saturated steering-angle setpoint $\delta_{ref}$ from exceeding the limit expressed by the equation Math2 and an integrator block allowing the saturated steering-angle setpoint $\delta_{ref}$ to be obtained (via a Laplace transform).

The parameter A represents the dynamics of the blocks SAT2 (in the present application, $\lambda$ may be considered to be equal to 500), and the greater $\lambda$, the more this pseudo rate limiter behaves like a rate limiter.

In FIG. 3, the block $P_{sys}$ represents the open-loop system that describes the dynamics of the vehicle and the behavior of the power-steering actuator.

It may be seen that this block receives as input a disturbance w and the saturated steering-angle setpoint $\delta_{ref}$. It delivers as output an output vector y and an error z.

According to one advantageous feature, this error z to be minimized is a function of the path-following error $e_{yL}$ and of the relative heading angle between the longitudinal axis A1 of the vehicle and the tangent to the avoidance path T0 (referred to as the heading error $\Psi_L$ below), which as known should be minimized. It is thus possible to write:

$$z = e_{yL} + \alpha_\psi \cdot \psi_L \quad \text{[Math 4]}$$

In this equation, the term $\alpha_\psi$ is an adjustment coefficient that allows the error that it is desired to minimize as a priority (heading-angle error or position-following error) to be adjusted. It will be seen in the remainder of this description how the value of this adjustment coefficient is chosen. This output choice of error z makes it possible to guarantee both good position following and good heading following.

The output vector y is here considered equal to a preliminary state vector $x_p$, all the elements of which are measurable or estimable while driving, and which may be written in the form:

$$x_p = \begin{pmatrix} \beta & r & \psi_L & e_{YL} & \dot{\delta} & \delta & \rho_{ref} \end{pmatrix}^T \quad \text{[Math 5]}$$

The objective is then to determine the form of the controller K, which is a state feedback regulator allowing the unsaturated steering-angle setpoint $\delta_k$ to be computed on the basis of the preliminary state vector $x_p$.

It will be noted that one of the parameters of this state vector (the state variable $\rho_{ref}$) depends on the curvature of the avoidance path T0. The rate of change (i.e. the derivative) of the curvature is assumed to be known (since the avoidance path T0 is known). By integrating this rate of change into the model of the vehicle, an augmented system is therefore obtained the curvature of which becomes a state (which is an input of the controller K). In this way, curvature compensation is achieved in a more precise way (via knowledge of the rate of change of curvature) than it would be if a more conventional method (of feedforward type) considering static or weakly varying curvatures was used.

To allow it to be understood how a controller K that is suitable both in terms of stability and of performance is determined, the system Psys will first be described when it is operating in open-loop mode, i.e. in linear mode, without saturation (case where the saturated and unsaturated steering-angle setpoints $\delta_{ref}$, $\delta_k$ are equal).

This system may be written in the following generic form:

$$\begin{cases} \dot{x}_p = A_p \cdot x_p + B_p \cdot u_p + w \\ \dot{u}_p = -\lambda u_p + \lambda u_K \end{cases} \quad \text{[Math 6]}$$

In this equation:
the term $u_p$ is the saturated control input, here equal to the saturated steering-angle setpoint $\delta_{ref}$,
the term $u_k$ is the unsaturated control input, here equal to the unsaturated steering-angle setpoint $\delta_k$,
w is the disturbance, which is assumed to be bounded,
$A_p$ is a dynamic matrix,
$B_p$ is a control matrix, and
$B_w$ is a disturbance matrix.

These three matrices may be written in the following form.

$$A_p = \begin{bmatrix} -\frac{C_f + C_r}{mV} & -1 + \frac{C_r l_r - C_r}{mV^2} & 0 & 0 & 0 & \frac{C_f}{mV} & 0 \\ -\frac{C_f l_f - C_r l_r}{J} & -\frac{C_r l_r^2 + C_f l_f^2}{JV} & 0 & 0 & 0 & \frac{C_f l_f}{J} & 0 \\ 0 & 1 & 0 & 0 & 0 & 0 & 0 \\ V & l_s & V & 0 & 0 & 0 & -V \\ 0 & 0 & 0 & 0 & -2\xi\omega & -\omega^2 & 0 \\ 0 & 0 & 0 & 0 & 1 & 0 & 0 \\ 0 & 0 & 0 & 0 & 0 & 0 & -\omega_f \end{bmatrix} \quad \text{[Math 7]}$$

$$B_p = \begin{bmatrix} 0 \\ 0 \\ 0 \\ 0 \\ \omega^2 \\ 0 \\ 0 \end{bmatrix} \quad \text{[Math 8]}$$

$$B_w = \begin{bmatrix} 0 \\ 0 \\ 0 \\ 0 \\ 0 \\ 0 \\ \omega_f \end{bmatrix} \quad \text{[Math 9]}$$

The controller K, for which optimal gains that meet the control criteria are sought, and which is defined as a static state feedback regulator, may for its part be expressed in the form:

$$u_K = K \cdot x \qquad \text{[Math 10]}$$

with $$\begin{cases} K = [K_p K_{aw}] \\ x = [x_p u_p]^T \end{cases} \qquad \text{[Math 11]}$$

x being the state vector enhanced by the saturated steering-angle setpoint $\delta_{ref}$ considered in the remainder of this description. Its parameters will be called state variables.

The term $u_k$ is, in the present application, considered equal to the unsaturated steering-angle setpoint $\delta_k$.

The system Psys may now be described in closed-loop mode, i.e. in non-linear mode with saturation (case where the saturated and unsaturated steering-angle setpoints $\delta_{ref}$, $\delta_k$ are unequal).

Based on the equations Math 6 and Math 10, the following may be written:

$$\dot{x} = (A + BA_1 + BB_1 K)x + BB_1 \psi_1(x) + B\psi_2(x) \qquad \text{[Math 12]}$$

In this equation, the terms x, A, B, $A_1$ and $B_1$ are defined as follows:

$$x = \begin{pmatrix} x_p \\ u_p \end{pmatrix} = \begin{pmatrix} \beta & r & \psi_L & e_{y_L} & \delta & \delta & \rho_{ref} & \delta_{ref} \end{pmatrix}^T \qquad \text{[Math 13]}$$

$$A = \begin{bmatrix} A_p & B_p \\ 0 & 0 \end{bmatrix} \qquad \text{[Math 14]}$$

$$B = \begin{bmatrix} 0 \\ I \end{bmatrix} \qquad \text{[Math 15]}$$

I being the identity matrix $$A_1 = [0 \quad -\lambda] \qquad \text{[Math 16]}$$

$$B_1 = \lambda \qquad \text{[Math 17]}$$

To take into account controllability constraints such as defined in the equations Math 2 and Math 3, two new saturation functions $\Psi_1(x)$ and $\Psi_2(x)$, which represent the exceedance of the limits of the input of the unsaturated command, have been introduced.

It is then sought to model the saturation functions via modeling using dead-zone nonlinearity, on the basis of work disclosed in the document referenced: "Alessandra Palmeira, João Manoel Gomes da Silva Jr, Sophie Tarbouriech, I. Ghiggi. Sampled-data control under magnitude and rate saturating actuators. International Journal of Robust and Nonlinear Control, Wiley, 2016, 26 (15), pp. 3232-3252"

The two saturation functions $\Psi_1(x)$ and $\Psi_2(x)$ may therefore be defined as follows:

$$\psi_1(x) = sat_\eta(Kx) - Kx \qquad \text{[Math 18]}$$

$$\psi_2(x) = sat_\nu (A_1 x + B_1 sat_\eta(Kx)) - (A_1 x + B_1 sat_\eta(Kx)) \qquad \text{[Math 19]}$$

In these two equations, a saturation function denoted $sat_{f0}(f)$ is used, which may be defined as follows:

$$\begin{cases} sat_{f_0}(f) = f \text{ if } |f| \le f_0 \\ sat_{f_0}(f) = f_0 \text{ if } |f| \ge f_0 \end{cases} \qquad \text{[Math 20]}$$

It will therefore be noted that these two saturation functions $\Psi_1(x)$ and $\Psi_2(x)$ have zero values in unsaturated mode and non-zero values otherwise.

To model the controllability limits of the system, two polyhedra may be defined, one of which, denoted $S_1(x, \eta)$, models the behavior of saturation in amplitude and the other, denoted $S_2(x, \Psi_1, v)$, models the behavior of saturation in velocity. These two polyhedra may be modeled in the following form:

$$S_1(x, \eta) = \{x \in R^n, |(K - G_1)x| \le \eta\} \qquad \text{[Math 21]}$$

$$\qquad \text{[Math 22]}$$
$$S_2(x, \psi_1, v) = \{x \in R^n, \psi_1 \in R^m, |(A_1 + B_1 K - G_2)x + (B_1 - G_3)\psi_1(x)| \le v\}$$

These models involve matrices $G_1$, $G_2$ and $G_3$. These matrices are the same size as the controller K. They describe the deviation that is permitted in respect of exceedance of the saturation constraints.

By way of illustration, the matrix G1 could be considered equal to the product of multiplying the matrix comprised in the controller K by a scalar $\alpha K$. Then the equation Math 21 could be rewritten in a form involving the term $(1-\alpha K)$, which would then allow the permitted exceedance to be adjusted. This exceedance may for example be set to 10%. To set this exceedance, it is recommendable to carry out road tests.

However, preferably, this matrix G1 will not be a function of the matrix comprised in the controller K. It will have to be optimized not by road tests, but by computation, for example using a method based on linear matrix inequalities. In this way, the conservatism of a solution such as that described in the preceding section will be avoided.

However, preferably, this matrix $G_1$ will not be a function of the matrix K. It will have to be optimized not by road tests, but by computation, for example using a method based on linear matrix inequalities. In this way, the conservatism of a solution such as that described in the preceding section will be avoided.

First, it may be assumed that, during operation of the system in closed-loop mode (such as defined in equation Math 12), the state vector x and the variable $\Psi_1$ are found in these two polyhedra, and hence it is possible to write:

$$\begin{cases} x \in S_1(x, \eta) \\ (x, \psi_1) \in S_2(x, \psi_1, v) \end{cases} \qquad \text{[Math 23]}$$

Figure 4:
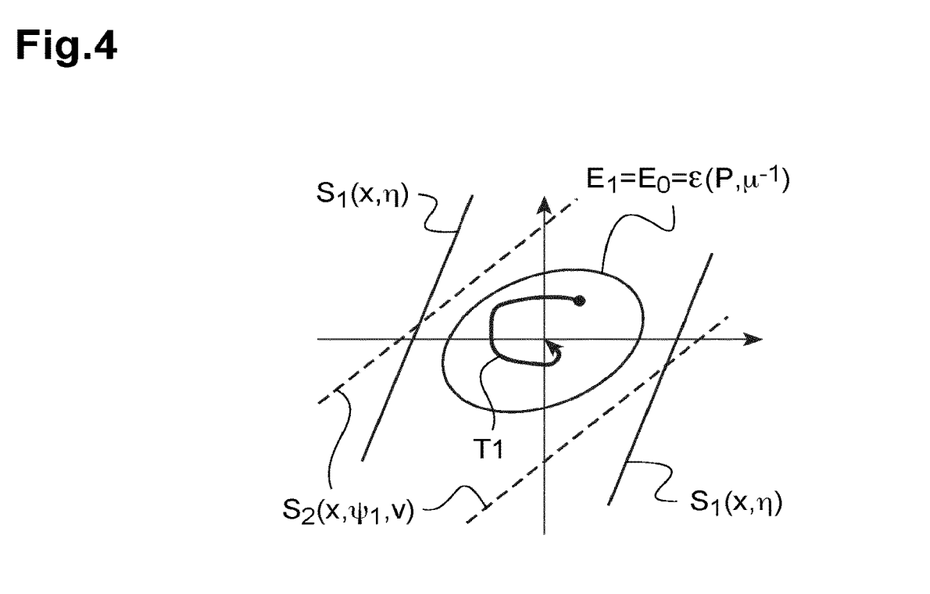
FIG. 4 is a graph illustrating the saturation polyhedra and the basin of attraction of the controller used in the context of the invention, and one example of variation in the state of the vehicle in the absence of disturbance.
Figure 5:
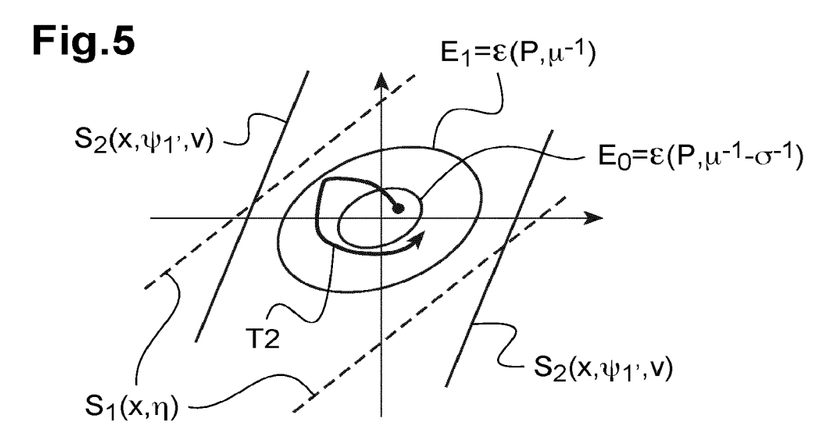
FIG. 5 is a graph similar to that of FIG. 4, in which the example of variation in the state of the vehicle has been shown in the case of presence of a disturbance.

These two polyhedra have been shown here in FIGS. 4 and 5 and therefore represent, as was well described above, the two spaces within which system stability and performance are guaranteed.

It will be noted at this stage that these figures show graphs in two dimensions, simplifying the solution described above with a view to making it more comprehensible.

In other words, this two-dimensional representation would only be valid if the state vector x contained only two state variables, one forming the abscissa and the other the ordinate of each of these graphs.

In practice, here, the state vector contains eight state variables. A representation of the invention would therefore have to be drawn in eight dimensions.

Under the assumption stated in the above equation, the following inequalities are satisfied for all positive diagonal matrices $U_1$ and $U_2$, which are here more precisely positive scalar quantities:

$$\begin{cases} \psi_1^T U_1 (\psi_1 + G_1 x) \leq 0 \\ \psi_2^T U_2 (\psi_2 + G_2 x + G_3 \psi_1) \leq 0 \end{cases} \quad [\text{Math 24}]$$

It will be noted here that these scalar quantities $U_1$ and $U_2$ are here introduced simply to facilitate the subsequent computations (according to the S-procedure).

To summarize, the equations Math 21 and 22 are two models of saturation, in amplitude and velocity, respectively, that, as long as they remain valid in the sense of the equation Math 23, make it possible to ensure that the equations Math 24 are also valid.

These models may then be used to synthesize (i.e. optimize) the main gain $K_p$ of the state feedback, which is related to the state variables of the open-loop system P and the saturation compensation gain $K_{aw}$ (or "anti-windup gain") of the controller K.

The closed-loop equation Math 12 and the representation of the system Psys shown in FIG. 3 make it possible to write:

$$\begin{cases} \dot{x} = (A + BA_1 + BB_1 K)x + BB_1 \psi_1(x) + B\psi_2(x) + B_w w \\ z = C_z x \end{cases} \quad [\text{Math 25}]$$

In this equation, z is the error of the system in question, with $z = e_{yL} + \alpha_L \cdot \Psi_L$.

The matrix $C_z$ is then expressed in the following way:

$$C_z = [0 \ 0 \ \alpha_\psi \ 1 \ 0 \ 0 \ 0 \ 0] \quad [\text{Math 26}]$$

It is assumed that the disturbance w is limited in energy, i.e. bounded, so that it is possible to write:

$$\|w\|_2^2 = \int_0^\infty w^2(t) dt \leq \sigma^{-1} \quad [\text{Math 27}]$$

This assumption is related to the fact that the curvature of the path (which is here considered to be a disturbance) and the activation duration of the AES function are always bounded.

Therefore, in the equation Math 27, where the term w represents the curvature of the avoidance path, the maximum value $w_{max}$ of this curvature is known (since the dynamic limits of the vehicle are known and therefore the maximum curvature that the vehicle is able to follow safely and that may therefore be imposed during path planning is known). Therefore, the parameter $\sigma$ may be defined as follows:

$$\sigma = \frac{1}{\int_0^{T_{AES}} w_{max}^2(t) dt} \quad [\text{Math 28}]$$

In this equation, the time $T_{AES}$ corresponds to the maximum activation duration of the AES function, which is generally comprised between 1 and 3 seconds, and corresponds in particular to the duration of the avoidance maneuver.

Given the controllability limits that it is desired to impose, $w_{max}$ being the curvature of the most dynamic reference path that the AES function is able achieve, this maximum curvature may be estimated depending on the maximum steering angle (set by controllability constraint Math 3). Therefore, it is thus possible to write:

$$w_{max} = \frac{l_f (C_f + C_r)}{C_r [(l_f + l_r)^2 + \kappa V^2]} \eta \quad [\text{Math 29}]$$

In this equation, the term K is the understeer gradient, which is computed in the following way:

$$\kappa = m \left( \frac{l_r}{C_f} - \frac{l_f}{C_r} \right) \quad [\text{Math 30}]$$

To obtain an optimal solution for the controller K, a first Lyapunov function V(t) is first defined for the following stability conditions:

$$V(t) = x^T P x \quad [\text{Math 31}]$$

Optionally, a second Lyapunov function $V_\gamma(t)$ may also be defined for the following performance conditions:

$$V_\gamma(t) = x^T P_\gamma x \quad [\text{Math 32}]$$

In these two equations, the matrices P and $P_\gamma$ are defined to be positive and symmetrical.

The advantage of the first Lyapunov function V(t) is that, if its first derivative is strictly negative, it guarantees that the system will always be stable in the absence of disturbance.

The idea here is then to use this derived first function, subtracting from it a term that takes into account the disturbances and another term that takes into account the saturation (in the sense of the equation Math 24), and to ensure that this set is always strictly negative, which may be written:

$$\dot{V}(t) - w^T \cdot w - 2 \cdot \psi_1^T U_1 (\psi_1 + G_1 x) - \quad [\text{Math 33}]$$
$$2 \cdot \psi_2^T U_2 (\psi_2 + G_2 x + G_3 \psi_1) < 0$$

This condition concerning the first Lyapunov function V(t) guarantees stability with the presence or absence of disturbance and with the presence of actuator saturation.

FIGS. 4 and 5 show the two polyhedra ensuring the stability and performance of the system. A space located simultaneously in these two polyhedra will then be sought. For example, it could be a question of the intersection of these two spaces.

However, here, this space is preferably modeled in the form of an ellipse, referred to as the basin of attraction. This basin of attraction ε is here defined to take the form:

$$\varepsilon(P, \mu) = \{x \in R^n, x^T P x \le \mu^{-1}\} \qquad \text{[Math 34]}$$

In addition to the stability condition concerning the first Lyapunov function V(t) defined by Math 33, this basin of attraction must be included in the two polyhedra S1 and S2, which model saturation in amplitude and in velocity, respectively, to guarantee system stability (which remains the priority to be guaranteed).

To guarantee performance, a second space could also be defined, on the basis of the second Lyapunov function $V_\gamma(t)$, but it is preferable here to use another model (the H-infinity model, which will be mentioned below).

The basin of attraction & is therefore a stability space (or invariant space) of the considered system. In other words, it is a space in which the paths of the state variables (i.e. the components of the state vector x) remain, provided that they have been initialized in this space (even if the system is subjected to disturbances and actuator saturation).

Taking into account the equations Math 21, Math 22 and Math 34, spaces in which the state variables of the system may lie have been schematically shown in FIGS. 4 and 5.

As will be understood from these figures, the controller K is then synthesized so as to meet three objectives.

The first objective is that, in the absence of disturbance, the controller K guarantees that the paths of the state variables of the closed-loop system remain in the basin of attraction ε (this ensuring stability) and asymptotically converge toward the origin (this ensuring performance), particularly in a predefined time.

In FIG. 4, the case of absence of disturbance has been considered. In this case, the space of the initial conditions of the system, denoted $E_0$, and the estimate $E_1$ of the basin of attraction ε are coincident. It may be seen that the path T1 of the state vector x from any initial situation indeed converges toward the origin.

The second objective is that, in the presence of disturbance, the controller K guarantees that the paths of the state variables of the closed-loop system remain in the basin of attraction ε (this ensuring stability) regardless of the disturbance w, provided that the latter is limited in energy (in the sense of the equation Math 27).

In FIG. 5, the case where a disturbance occurs has been considered. In this case, the space of the initial conditions of the system, denoted $E_0$, is necessarily contained in the estimate $E_1$ of the basin of attraction ε. It may be seen therein that the path T2 of the state variables, when it starts from any initial situation contained in the space $E_0$, indeed remains contained inside the basin of attraction e.

The third objective is, in linear mode (without saturation in amplitude and speed), for the controller K to guarantee the performance of the system, which then takes precedence over stability, by making it so that the synthesis of the $H^\infty$ norm is less than a predetermined scalar.

It will be recalled that this synthesis consists in finding the controller K that is such that the $H^\infty$ norm of the term $F_l(P_{sys}, K)$ is minimum, with:

$$z = F_l(P_{sys}, K) \cdot w \qquad \text{[Math 35]}$$

This equation may be written in the following form:

$$\dot{V}_\gamma(t) + z^T z - \gamma^2 w^T w < 0 \qquad \text{[Math 36]}$$

It will be noted here that γ is the $H^\infty$ norm of the transfer function of w→z.

This synthesis implies a good rejection of the disturbance w and good following of the reference path (with an error z close to zero).

In practice, to meet these three objectives, a number of methods could be used, for example a method based on the solution of Riccati equations or a method using Youla parameterization.

However, the method used here is preferentially use of Finsler's lemma applied to linear matrix inequalities (LMI) to decrease conservatism (LMI relaxation), this Finsler's lemma being applied in particular to both stability (equation Math 33) and performance (equation Math 35). It is thus implemented based on convex optimization criteria under LMI constraints (the linearity of the terms of the matrices used ensures that the mathematical problem is solvable without too much computational power being required).

The objective is more precisely to optimize the gains of the closed loop defined by the controller K through pole selection.

For predefined positive real numbers $\varepsilon_1$ and $\varepsilon_2$, there if are matrices of appropriate sizes R, $\tilde{Q}$, Q, $\tilde{Q}_\gamma$, $L_1$, $L_2$, $T_1$, $T_2$ and a scalar $\varepsilon_3$ such that the optimization problem is feasible, a controller K is therefore obtained that meets the three aforementioned objectives.

These matrices are computed depending on the matrix P (see equation Math 42).

The matrix inequalities used here are five in number and are defined by the following inequalities, in which γ is to be minimized.

$$\begin{bmatrix} (A+BA_1)Q^T + BB_1R + Q(A+BA_1)^T + R^TB_1^TB^T & \tilde{Q} - Q^T + \varepsilon_2 Q(A+BA_1)^T + \varepsilon_1 R^T B_1^T B^T & B_w & -L_1 + BB_1T_1 & -L_2 + B\ T_2 \\ \tilde{Q} - Q + \varepsilon_1(A+BA_1)Q^T + \varepsilon_1 BB_1 R & -\varepsilon_1 Q^T - \varepsilon_1 Q & \varepsilon_1 B_w & \varepsilon_1 BB_1 T_1 & \varepsilon_1 BT_2 \\ * & * & -I & 0 & 0 \\ * & * & * & -2T_1 & -T_1 B_1^T \\ * & * & * & * & -2T_2 \end{bmatrix} < 0 \qquad \text{[Math 37]}$$

$$\begin{bmatrix} \tilde{Q} & R^T - L_1 \\ * & \mu\eta^2 \end{bmatrix} \ge 0 \qquad \text{[Math 38]}$$

$$\begin{bmatrix} \tilde{Q} & QA_1^T + R^T B_1^T - L_2 \\ * & \mu v^2 \end{bmatrix} \ge 0 \qquad \text{[Math 39]}$$

$$\sigma - \mu \ge 0 \qquad \text{[Math 40]}$$

-continued $$\begin{bmatrix} (A+BA_1)Q^T + BB_1R + Q(A+BA_1)^T + R^T B_1^T B^T & \tilde{Q}_T + \varepsilon_2 Q(A+BA_1)^T + \varepsilon_2 R^T B_1^T B^T - Q^T & QC_z^T & B_w \\ * & -\varepsilon_2 Q^T - \varepsilon_2 Q & 0 & \varepsilon_2 B_w \\ * & * & -(2\varepsilon_3-1)I_z & 0 \\ * & * & * & -\gamma^2 I_w \end{bmatrix} < 0 \quad \text{[Math 41]}$$

In these inequalities, a matrix of the form $$\begin{bmatrix} X & Y \\ Y^T & W \end{bmatrix}$$

is written in the form $$\begin{bmatrix} X & Y \\ * & W \end{bmatrix}.$$

The matrices R, $\tilde{Q}$, Q, $\tilde{Q}_\gamma$, $L_1$, $L_2$, $T_1$, $T_2$ are here expressed in the following form:

$$\begin{cases} \tilde{Q} = J^{-1} P J^{-T} \\ \tilde{Q}_\gamma = J^{-1} P_\gamma J^{-T} \\ R = K J^{-T} \\ Q = J^{-1} \\ T_1 = U_1^{-1} \\ T_2 = U_2^{-1} \\ L_1 = J^{-1} G_1^T \\ L_2 = J^{-1} G_2^T \end{cases} \quad \text{[Math 42]}$$

In these equations, J is a non-singular matrix.
The controller K is defined by the equation:

$$K = R \cdot Q^{-1} \quad \text{[Math 43]}$$

The speed V of the vehicle is assumed to remain constant (therefore all the matrices of the system are considered to remain constant).

The four inequalities Math 37 to Math 40 make it possible to ensure that the dynamics of the closed loop remain limited, i.e. that the system remains stable in the absence or presence of a disturbance (the first two conditions are therefore met).

The fifth equation Math 1 guarantees the performance (in the sense of the $H^\infty$ norm) of the closed-loop system when the system is subjected to a disturbance and when the output of the control K has not yet saturated (neither in amplitude nor in speed, i.e. when the steering instructions $\delta_{ref}$ and $\delta_k$ are equal). This inequality ensures that the third condition is met.

Figure 6:
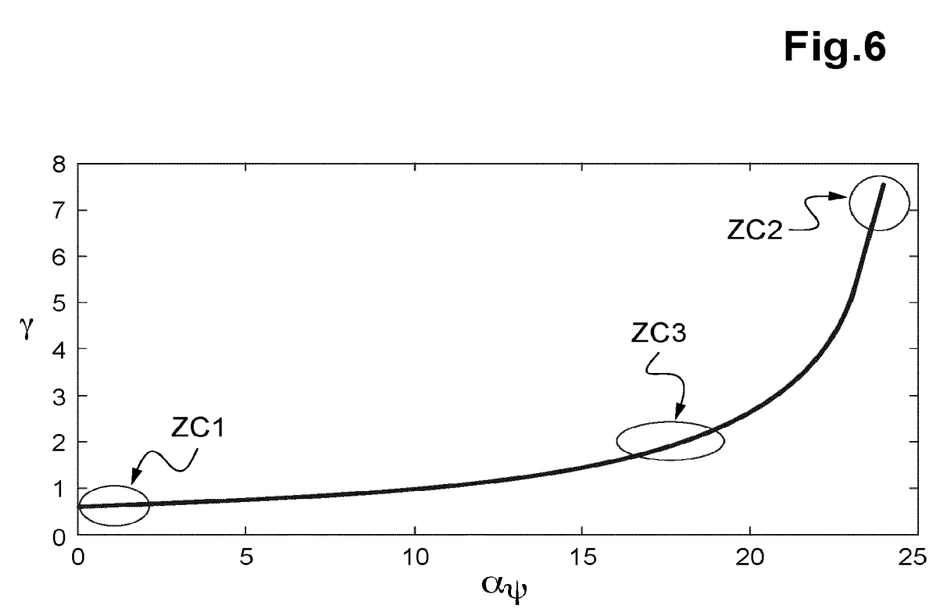
FIG. 6 is a graph illustrating the influence of an adjustment on controller performance.

As shown in FIG. 6, a plurality of types of controller K may be obtained depending on the chosen value of $\alpha_\psi$.

In this figure, it may thus be seen that it is possible to modify the performance of the controller K by adjusting the value of $\alpha_\psi$.

Thus, the adjustment coefficient $\alpha_\psi$, when it has a low value, allows a controller K to be obtained that minimizes position-following error (zone ZC1). In contrast, when it has a high value, it allows a controller K to be obtained that minimizes the heading-following error (zone ZC2). Between these extreme values, it is possible to achieve a compromise between position following and heading following (zone ZC3).

At the start of f avoidance, the adjustment coefficient $\alpha_\psi$ will be chosen to have a low value (lower than 20), to minimize the position-following error and to ensure that the vehicle correctly follows the avoidance path T0.

At the end of avoidance (once the obstacle has been passed), the adjustment coefficient $\alpha_\psi$ will be chosen to have a high value (higher than 20), to minimize the heading-following error and to ensure that the vehicle returns to being correctly positioned parallel to the road.

Thus, by way of example, if the driver wishes to regain control at the end of avoidance, the high value of the adjustment coefficient $\alpha_\psi$ is such that the saturated steering-angle setpoint $\delta_{ref}$ transmitted to the power-steering actuator will help the driver to stabilize the vehicle.

Again by way of example, if the driver wishes to regain control at the start of avoidance and if he moves much further away from the obstacle than expected (in the sense of the avoidance path T0), the high value of the adjustment coefficient $\alpha_\psi$ at the end of avoidance makes it so that the saturated steering-angle setpoint $\delta_{ref}$ does not bring the vehicle back onto the avoidance path unnecessarily given that the latter has been exceeded by a large margin anyway (which, if it were not the case, would potentially disconcert the driver).

At this stage, it will be noted that Finsler's lemma (within the meaning of the document "Skelton, R. E., Iwasaki, T., and Grigoriadis, K. M. (1998). A Unified Algebraic Approach to Linear Control Design. Taylor and Francis, London") has been applied to linear matrix inequalities to decrease conservatism. Specifically, two different Lyapunov matrices $\tilde{Q}$ and $\tilde{Q}_\gamma$ (instead of a single common matrix) used have been for stability and performance criteria, respectively.

The provided method has therefore proven to be effective when it comes to determining, at any given time, the steering-wheel angle in a manner that is reasonable (and controllable by a driver of average skill) and in a manner that is achievable by the actuator.

After solving the linear matrix inequalities, the controller K is recomputed using the following equation:

$$K = R \cdot J^T \quad \text{[Math 44]}$$

with $$J = Q^{-1} \quad \text{[Math 45]}$$

Once the controller K has been obtained, the computer may be used to compute the unsaturated steering-angle setpoint $\delta_k$ by means of the following formula:

$$\delta_K = K \cdot x \quad \text{[Math 46]}$$

The controller K found during design of the vehicle may then be implemented in the computers 13 of the motor vehicles 10 of the range.

Figure 7:
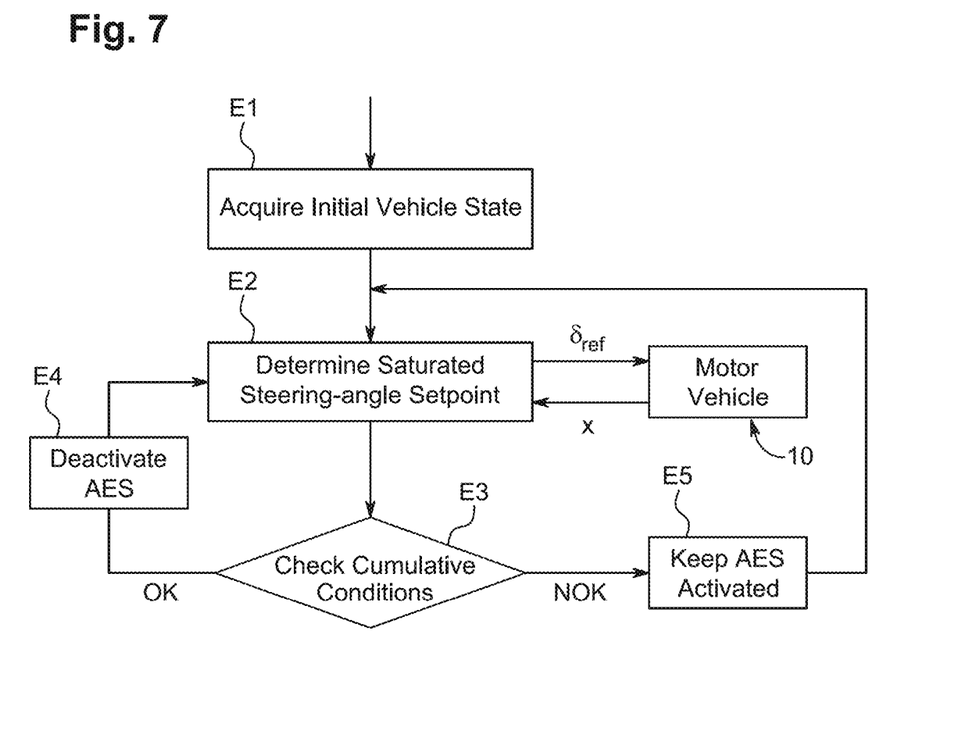
FIG. 7 is a flowchart illustrating an algorithm for controlling the vehicle according to a method according to the invention.

At this stage, the method that will be executed by the computer 13 of one of these motor vehicles to implement the invention will be described with reference to FIG. 7.

The computer 13 is here programmed to implement this method recursively, that is to say step by step, and in a loop.

To do this, in a first step, the computer 13 checks that the AES function (AES standing for Automatic Evasive Steering) is activated and that an obstacle avoidance path has been planned.

The computer 13 will then seek to define a control setpoint for the conventional steering system, namely a saturated steering-angle setpoint $\delta_{ref}$ allowing this avoidance path T0 to be followed as best as possible.

To do so, it starts by computing or measuring the following parameters:
- the measured steering angle $\delta$,
- the derivative with respect to time of the measured steering angle $\dot\delta$,
- the saturated steering-angle setpoint $\delta_{ref}$ obtained in the preceding time increment,
- the yaw rate r,
- the relative heading angle $Y_L$,
- the path-following error $e_{yL}$,
- the curvature $\rho_{ref}$ of the avoidance path,
- the drift angle $\beta$.

The computer 13 then uses the controller K stored in its memory. This controller K will therefore make it possible to determine, in a first step, the values of the unsaturated and saturated steering-angle setpoints ok and $\delta_{ref}$.

It will be noted that the controller K is synthesized taking into account the saturation functions, and hence the setpoints are perfectly tailored to the chosen saturation model.

The saturated steering-angle setpoint $\delta_{ref}$ will then be transmitted to the power-steering actuator with a view to steering the wheels of the motor vehicle 10.

It is possible, once the AES function has been activated, for faults to occur (sensor failure, failure of the power-steering system, vehicle and/or driver behavior that cannot be managed by the K controller, etc.). In this case, provision is made to deactivate the AES function.

The overall control strategy employed may then be described with reference to FIG. 7.

The first step E1 occurs at the moment when the AES function is activated.

At this time, the computer 13 acquires the initial state of the vehicle, which is defined by the state vector x (denoted, at this initial time, $x_0$).

In the second step E2, the computer may, using the controller K and taking into account the avoidance path to be followed, determine a saturated steering-angle setpoint $\delta_{ref}$. This setpoint is sent to the power-steering actuator of the motor vehicle 10, which reacts in such a way that the vehicle may be defined by a new state vector X.

The method for computing the saturated steering-angle setpoint $\delta_{ref}$ is then repeated in a loop, at regular time increments, so that the vehicle follows the avoidance path as best as possible.

In parallel, and here in each new loop, the computer 13 checks whether a fault has occurred that requires the AES function to be deactivated.

To do this, in a step E3, the computer checks whether two cumulative conditions are met.

The first condition is that the initial state vector $x_0$ does not belong to the space $E_0$ of the initial conditions of the system. The second condition is that the state vector x (of the time increment in question) does not belong to the estimate $E_1$ of the basin of attraction $\varepsilon$. These two conditions may be written in the following way:

$$\begin{cases} x_0 \notin E_0 = \varepsilon(P, \mu^{-1} - \sigma^{-1}) \\ x \notin E_1 = \varepsilon(P, \mu^{-1}) \end{cases} \quad \text{[Math 47]}$$

If these two cumulative conditions are met, then there is a risk of system instability, and hence, in a step E4, the computer 13 automatically deactivates the AES function.

In the contrary case, in a step E5, the computer decides to keep the AES function in the activated state, in order to avoid the obstacle.

Therefore, the computer loops the method back to step E2.

It will be noted that, as a variant, the computer could deactivate the AES function on the basis of the first condition only. Specifically, it is probable, when this first condition is met, that it will not be possible to control the vehicle so that it follows the avoidance path in complete safety.

However, here the second condition makes it possible to wait for detection of real vehicle control instability before deactivating the AES function. Specifically, when the initial state vector is outside the space $E_0$, it is possible for vehicle control to remain stable, for example under the action of a gust of wind or because the driver has not let go of the steering wheel and is participating in the avoidance.

It will be noted here that if new road circumstances arise, the change of scene will require the AES function to be reactivated. In the case where the AES function is not reactivated but if, for various reasons, the process continues, this new scene will impact the controller K in step E3, this potentially resulting in automatic deactivation of the AES function.

The present invention is in no way limited to the embodiment described and shown, and those skilled in the art will be able to apply any variant according to the invention thereto.

Thus, the method may be applied to fields of other types in which a particular path must be followed, for example in aeronautics or robotics (in particular when the robot is small and one of its controls must be saturated).

The invention claimed is:

1. A method of autonomously controlling a steering actuator of an automotive apparatus that is configured to influence a path of said apparatus, the method comprising:
   acquiring parameters relating to the path of the apparatus, and
   computing, using a computer, a control setpoint of said actuator depending on said parameters, via a controller associated with at least one saturation function of an output of the controller,
   wherein the controller allows modeling of said at least one saturation function to use dead-zone nonlinearity,
   wherein the saturation function respects a model limiting an amplitude of the control setpoint and is expressed in the form:

$$\psi_1(x) = sat_\eta(Kx) - Kx,$$

with

K being the controller, $sat_\eta$ being an amplitude-limiting function, and x being a state vector of said apparatus, and wherein the control method further comprises controlling the steering actuator to control a steering angle of at least one steered wheel of the automotive apparatus based on the control setpoint.

2. The control method as claimed in claim 1, wherein the apparatus is a motor vehicle that is configured to travel by road and that comprises the at least one steered wheel, and wherein the control setpoint is a saturated setpoint of the steering angle of said steered wheel.

3. The control method as claimed in claim 1, wherein the saturation function respects a model limiting a variation in the control setpoint and is expressed in the form:

$$\psi_2(x) = sat_v(A_1 x + B_1 sat_\eta(Kx)) - (A_1 x + B_1 sat_\eta(Kx))$$

with

K being the controller, $sat_v$ being an amplitude-limiting function, $A_1$ and $B_1$ being predetermined matrices, and x being a state vector of said apparatus.

4. The control method as claimed in claim 1, wherein, given a basin of attraction located in at least one polyhedron defined depending on how said at least one saturation function is modeled, in the absence of disturbance, the controller guarantees that a state vector of said apparatus has successive values over time that remain in the basin of attraction and that asymptotically converge toward the origin within a predetermined time.

5. The control method as claimed in claim 1, wherein, given a basin of attraction located in at least one polyhedron defined depending on how said at least one saturation function is modeled, in a presence of a disturbance an energy of which is less than a predetermined threshold, the controller guarantees that a state vector of said apparatus has successive values over time that remain in the basin of attraction.

6. The control method as claimed in claim 1, wherein, in an absence of saturation of the output of the controller, the controller guarantees that a synthesis of an H∞ norm applied to the controller is less than a predetermined scalar.

7. The control method as claimed in claim 1, wherein one of said parameters is a variable that depends on a curvature of the path.

8. The control method as claimed in claim 1, wherein, given a basin of attraction located in at least one polyhedron defined depending on how said at least one saturation function is modeled, said basin of attraction is defined via a Lyapunov function of disturbances that apply to said apparatus and of a term that depends on said at least one saturation function.

9. The control method as claimed in claim 1, wherein the controller allows modeling of said apparatus in which an output to be minimized is dependent on a path-following error and a heading-angle error.

10. The control method as claimed in claim 9, wherein the output (z) to be minimized is expressed in the form:

$$z = e_{y_L} + \alpha_\psi \cdot \psi_L$$

with $e_{y_L}$ being the path-following error, $\Psi_L$ being the heading-angle error, and $\alpha_\gamma$ being an adjustment coefficient that varies over time.

11. The control method as claimed in claim 1, in which provision is made to deactivate the controller:

as soon as initial values of a state vector of said apparatus do not belong to a first predetermined space, or when said initial values do not belong to the first predetermined space and instantaneous values of said state vector do not belong to a second predetermined space.

12. An automotive apparatus comprising:

at least one actuator that is configured to influence a path of said apparatus; and a computer configured to control said actuator, wherein the computer is programmed to implement the control method as claimed in claim 1.

* * * * *